235-380 SR

4/28/87 XR 4,661,983

United States Patent [19]

Knop

[11] Patent Number: 4,661,983

[45] Date of Patent: Apr. 28, 1987

[54] SECURE DOCUMENT IDENTIFICATION TECHNIQUE

[75] Inventor: Karl H. Knop, Zurich, Switzerland

[73] Assignee: RCA Corporation, Princeton, N.J.

[21] Appl. No.: 534,389

[22] Filed: Sep. 21, 1983

[30] Foreign Application Priority Data

Oct. 5, 1982 [GB] United Kingdom ................ 8228450

[51] Int. Cl.[4] ................................ G06K 9/00

[52] U.S. Cl. ................................ 382/1; 235/380; 235/487; 235/494; 283/74; 340/825.34; 350/162.20; 356/71

[58] Field of Search ...................... 350/162.19, 162.20, 350/162.21; 235/457, 487, 488, 494, 468, 380; 340/825, 825.33, 825.34; 382/1, 7; 356/71, 72, 73; 283/72, 74

[56] References Cited

U.S. PATENT DOCUMENTS 4,034,211 7/1977 Horst et al. ........................ 235/487
4,150,781 4/1979 Silverman et al. .................. 235/457
4,417,784 12/1983 Knop et al. .................... 350/162.19
4,450,348 5/1984 Stockburger et al. .............. 235/487
4,476,468 10/1984 Goldman ............................ 235/468
4,484,797 11/1984 Knop et al. .................... 350/162.19
4,493,107 1/1985 Stockburger et al. .............. 235/487
4,527,051 7/1985 Stenzel ................................ 283/74

*Primary Examiner*—Leo H. Boudreau
*Assistant Examiner*—Joseph Mancuso
*Attorney, Agent, or Firm*—Joseph S. Tripoli; George J. Seligsohn

[57] ABSTRACT

A random-pattern of microscopic lines that inherently forms in a dielectric coating layer of a 3-layer diffractive subtractive filter authenticating device incorporated in a secure document permits identification of a genuine individual document by comparing read-out line-position information derived by microscopic inspection with read-out digital codes of line-information obtained earlier at the time of fabrication of the document. The technique can also be used with an artificially generated random pattern of lines in the case of other types of authenticating devices that do not inherently form such a pattern.

1 Claim, 6 Drawing Figures

SECURE DOCUMENT IDENTIFICATION TECHNIQUE

This invention relates to a secure document identification technique and, more particularly, to a technique for determining whether an individual item of sheet material incorporating a particular one of a given type of authenticating device is genuine or is counterfeit.

This given type of authenticating device exhibits predetermined macroscopic reflectivity characteristics. Further, any one particular authenticating device of this given type includes a unique pattern of microscopic lines having widths in the order of micrometers that are randomly positioned in at least one dimension with each separation distance between adjacent lines being in the order of tens of micrometers.

Reference is made to co-pending U.S. patent application Ser. No. 387,614, filed by Knop, et al. on June 11, 1982, which is assigned to the same assignee as the present application. This co-pending application (which matured into U.S. Pat. No. 4,484,797) discloses a preferred embodiment of this given type of authenticating device. More specifically, this application discloses an authenticating device that operates as a diffractive subtractive color filter responsive to the angle of incidence of polychromatic illuminating light. Structurally, this diffractive subtractive color filter is comprised of a relatively high index-of-refraction inorganic dielectric coating layer situated at the interface between relatively low index-of-refraction plastic substrate and overcoat layers. The interface is in the form of a surface relief pattern defining a diffraction-grating line structure having a value of line spacing period with respect to free-space wavelengths included in the polychromatic illuminating light such that both zero and first diffraction order light can propagate in the inorganic dielectric coating layer but only zero diffraction order light can propagate in the plastic substrate and overcoat layers (for at least some of the relevant wavelengths).

It has been discovered that the inorganic dielectric coating layer of this three-layer diffractive subtractive color filter type of authenticating device inherently forms a unique pattern of cracks that are preferentially oriented parallel to the lines of the grating-line structure of the diffractive subtractive color filter. These preferentially oriented cracks constitute the aforesaid unique pattern of microscopic lines having widths in the order of micrometers that are randomly positioned in at least one dimension with each separation distance between adjacent lines being in the order of tens of micrometers.

It is understood that a technique exists which makes use of the differing light transmission characteristics at separate points of mat (e.g., paper) sheet material for determining whether an individual item incorporating the mat sheet material is genuine or is counterfeit. An example of such an item is a paper fare ticket used to operate an unattended automatic turnstile or gate giving access to streetcars in certain European cities. The paper fare ticket includes a record medium having coded information stored thereon. If the item is genuine, the stored coded information should correspond to the light transmission characteristics of the associated piece of paper sheet material of which the fare ticked is composed. Specifically, at the time of fabrication of the ticket, the relative light transmission is measured at each of a plurality of separated spatially predetermined point position locations thereof, and then this measured information is encoded and the codes recorded on a record medium incorporated in the item. Thereafter, it becomes possible to decode the coded information (by automatic machine or otherwise) and compare this decoded information with respective newly measured values of relative light transmission at each of the plurality of spatially predetermined point position locations of the paper sheet material. If the decoded and newly measured information substantially exactly match, the item is genuine; otherwise, it is counterfeit.

The present invention utilizes a unique pattern of microscopic lines having widths in the order of micrometers that are randomly positioned in at least one dimension with each separation distance between adjacent lines being in the order of tens of micrometers (such as the random pattern of cracks that inherently forms in the inorganic dielectric coating layer of the above-discussed diffractive subtractive color filter authenticating device) for determining whether an individual item is genuine or is counterfeit. More specifically, the method of the present invention comprises the steps of microscopically examining a certain preselected area of a particular authenticating device (of a type which includes the above-discussed unique pattern of microscopic lines) by deriving a line-position information signal that defines the locations of the respective positions of the pattern lines in at least one dimension within the certain preselected area. The line position information is then digitally encoded to generate respective digital codes of the position location of each of at least some of the pattern lines within the certain preselected area and the generated digital codes are stored. Thereafter, the microscopic examination step may be repeated for deriving for a second time the line position information. The stored digital codes are read out and compared to the second-derived line-position information to determine the degree of match therebetween. An individual item is indicated as genuine only in response to at least a certain portion of the line-position information contained in the second-derived signal substantially exactly matching the digitally-encoded line-position information contained in the read-out digital codes.

IN THE DRAWING

Figure 3:
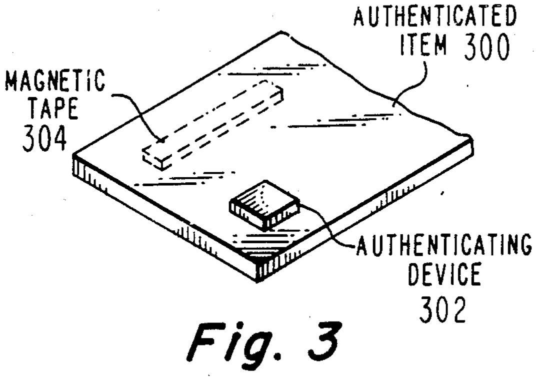
FIG. 3 illustrates an authenticated item of sheet material incorporating a color filter of the type shown in FIG. 1 as an authenticating device and also incorporating a record medium in the form of a strip of magnetic tape.
Figure 4:
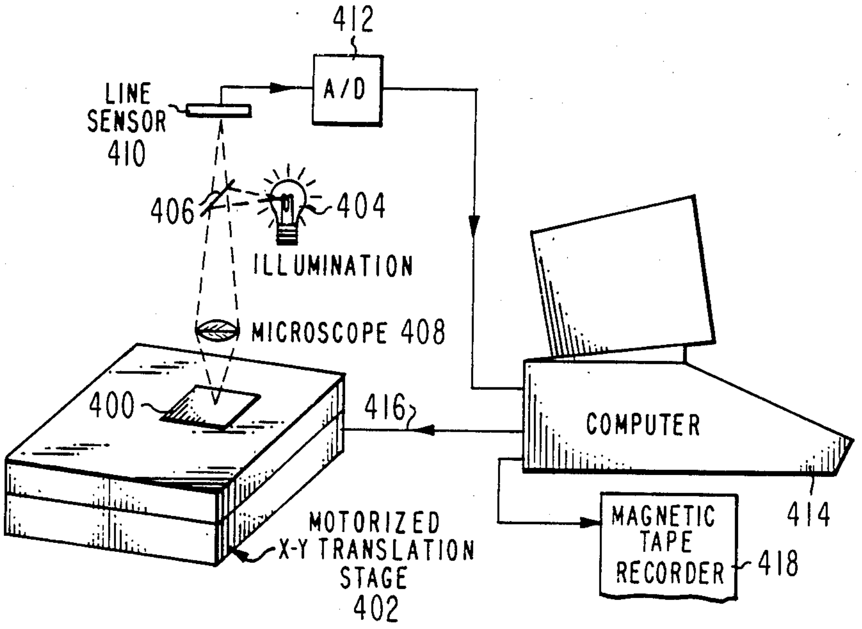
Figure 5:
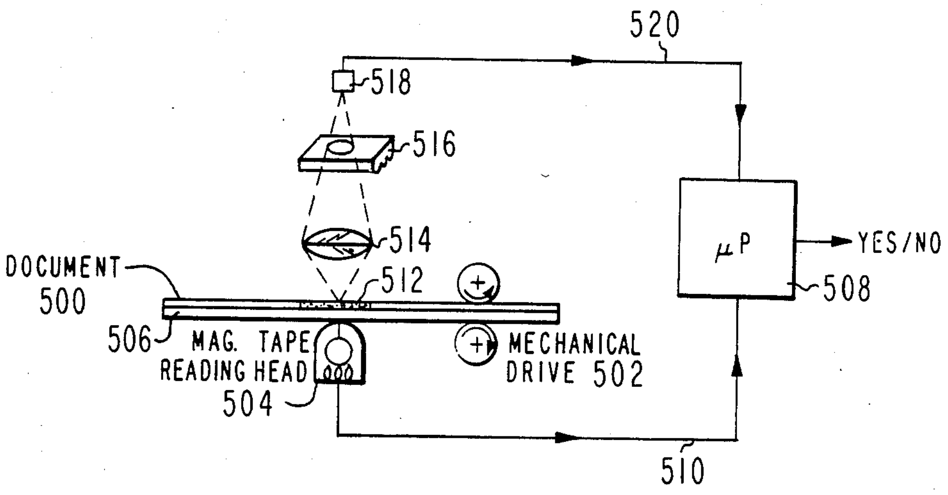

FIG. 4 is an illustrative example of a mechanism for recording on magnetic tape, shown in FIG. 3, digital codes representing line-position information for a preselected area of the crack pattern of the authenticating device shown in FIG. 3; and FIG. 5 is an illustrative example of a mechanism for reading out information from a document purporting to be a genuine authenticated item and for determining from this information whether or not the document is genuine or is counterfeit.

Figure 1:
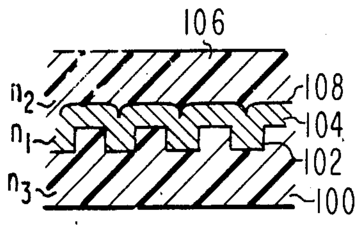
Fig. 1 PRIOR ART
FIG. 1 is an example of a diffractive subtractive color filter of the type disclosed in the aforesaid U.S. patent application No. 387,614.

Referring to FIG. 1, there is shown one of the species of diffractive subtractive color filters disclosed in the aforesaid U.S. patent application Ser. No. 387,614, which may be employed as an authenticating device for an authenticated item. This diffractive subtractive color filter is comprised of three layers, as indicated in Fig. 1. The three layers consist of a substrate layer 100 having a rectangular-wave profile diffraction grating 102 embossed as a surface relief pattern on the top surface thereof. A dielectric coating layer 104 (deposited by such means as evaporation or ion-beam sputtering) covers surface-relief grating 102. Coating layer 104, in turn, is covered by overcoat layer 106. Dielectric coating layer 104 is composed of an inorganic dielectric (such as ZnS) exhibiting a relatively high index-of-refraction $n_1$ (such as about 2.3). Overcoat layer 106 and substrate layer 100 are each composed of a similar material (such as a polyvinylchloride or polycarbonate plastic) that exhibit relatively low indices-of-refraction $n_2$ and $n_3$ (such as about 1.5). The line period and amplitude depth of grating 102 are in the sub-micrometer range (such as 0.38 and 0.12 micrometer, respectively). The nominal thickness of dielectric coating layer 104 is also in the sub-micrometer range (such as 0.12 micrometer). If the deposition of dielectric coating layer 104 were ideal, a top surface of coating layer 104 would form a grating profile substantially identical to that of grating 102. However, in practice, the deposition process (such as evaporation) tends to fill the troughs of grating 102 with deposited material to a greater extent than the crests of grating 102. Therefore, a surface relief grating 108 having the same line period as grating 102, but a different profile therefrom, is formed on the top surface of coating layer 104.

The wavelengths of polychromatic light (such as white light) traveling within relatively low indices of refraction substrate and overcoat layers is somewhat larger than the sub-micrometer line spacing period of gratings 102 and 108 at the interface therebetween. For this reason, only zero diffraction order light (for at least part of the wavelengths) can travel in substrate layer 100 and overcoat layer 106. However, the wavelengths of polychromatic light traveling within relatively high index-of-refraction dielectric coating layer 104 is somewhat smaller than the line spacing of gratings 102 and 108. Therefore, both zero diffraction order and first diffraction order light can travel within dielectric coating layer 104. Because of these relationships among the respective values of the parameters of the structure shown in FIG. 1, the structure operates as a diffractive subtractive color filter responsive to the angle of incidence of polychromatic illuminating light. In particular, at any angle of incidence, the structure reflects a portion of polychromatic illuminating light and transmits the remainder. The color of the reflected light is substantially the complement of the transmitted light. However, the color of the reflected light is different at different angles of incidence (and hence at different angles of reflection) of the polychromatic light. It is this latter feature that makes the diffractive subtractive color filter shown in FIG. 1 useful as an authenticating device for an authenticated item.

Figure 2:
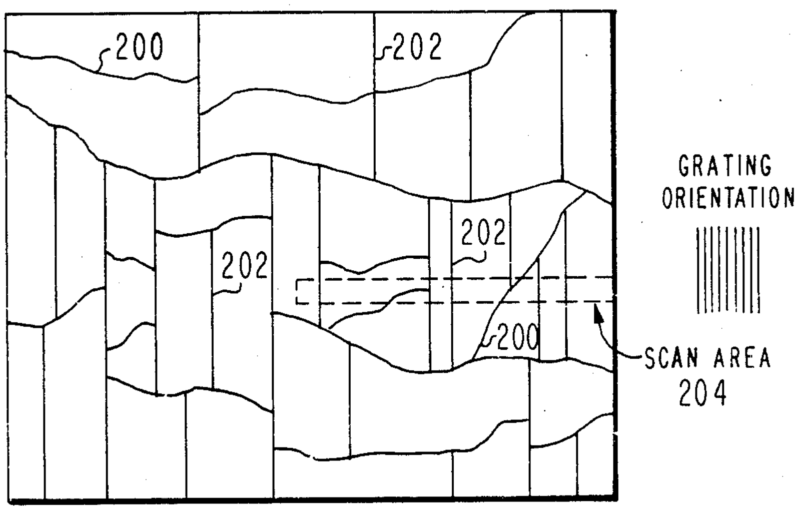
FIG. 2 illustrates a typical crack pattern inherently formed in the dielectric coating layer of the filter shown in FIG. 1.

It has been discovered that the dielectric coating layer 104 of an authenticating device comprised of a three-layer laminated structure, similar to that shown in FIG. 1, inherently forms microscopic cracks that are distributed in a random pattern having the type of appearance shown in FIG. 2. While this pattern includes many cracks 200 that are not in the form of straight lines and are not oriented substantially parallel to the lines of the diffraction grating, it is plain from FIG. 2 that the pattern preferentially includes cracks 202 that are in the form of straight lines oriented substantially parallel to the diffraction grating lines. The width of each one of the cracks 200 and 202 is in the order of micrometers. However, the spacing distance between adjacent straight-line cracks 202 is in the order of tens of micrometers. It is these characteristics of the random crack pattern (which crack pattern inherently occurs in an authenticating device comprised of the three-layer laminate shown in FIG. 1) that makes this random pattern useful in determining whether an individual authenticated item of sheet material incorporating this type of authenticating device is genuine or is counterfeit.

As shown in FIG. 3, the authenticated item 300 incorporates an authenticating device 302 situated in a predetermined location on the top surface of authenticated item 300. Authenticating device 302 is assumed to have the structure shown in FIG. 1 and to contain the particular random crack pattern shown in FIG. 2 in the dielectric coating layer thereof.

Figure 2A:
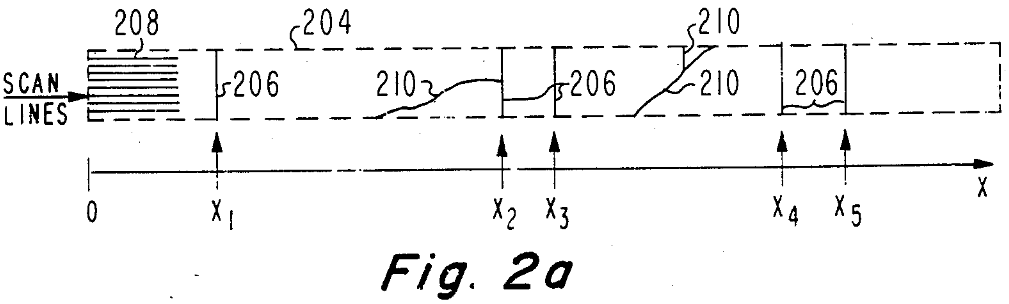
FIG. 2*a* shows an expanded view of a certain preselected area of the FIG. 2 crack pattern that is microscopically examined in accordance with the principles of the present invention.

Indicated in FIG. 2, is scan area 204. Scan area 204 is relatively small (e.g., 250×20 micrometers) and is situated at a certain preselected location of authenticating device 302. An expanded view of scan area 204 is shown in FIG. 2*a*. As indicated in both FIGS. 2 and 2*a*, the width of scan area 204 (e.g., 250 micrometers) is oriented substantially perpendicular to straight-line cracks 202 (i.e., perpendicular to the grating line orientation). Altogether, scan area 204 includes six straight-line cracks and two non-straight-line cracks. However, of these, only straight-line cracks 206 (indicated in FIG. 2*a*) extend the entire height (e.g., 20 micrometers) of scan area 204. In general, a random pattern of the type shown in FIG. 2 tends to contain about 5–10 straight-line cracks within a scan area width of 250 micrometers that extend the entire height of a 20 micrometer high scan area. As indicated in FIG. 2*a*, the respective locations along the X axis of the line positions of the five cracks 206 are $X_1$, $X_2$, $X_3$, $X_4$, and $X_5$. In general, the X-position location of the random pattern lines 206 is random (with the distance between adjacent lines tending to be in the order of tens of micrometers).

Scan area 204 may be microscopically inspected by a plurality of high resolution (e.g., two micrometers) scan lines 208 (FIG. 2*a*) extending the entire width of scan area 204. Thus, about ten successive 250×2 micrometers scans parallel to the width of scan area 204 are required to completely inspect the certain preselected 250×20 micrometer area of scan area 204. Such a microscopic inspection derives directly sensed information from which derivative information can be obtained for (1) distinguishing between straight-line cracks 206 that extend the entire height of scan area 204 and other cracks within scan area 204 which do not meet this constraint, and (2) determining substantially exactly the locations of the respective $X_1$, $X_2$, $X_3$, $X_4$, and $X_5$ line positions within the width of scan area 204. FIG. 4 illustrates an example of a mechanism for accomplishing this.

The mechanism of FIG. 4 is employed at the time of fabrication or generation of the individual authenticated item 400 of the type shown in FIG. 3 for deriving, in digitally coded form, line position information pertaining to a preselected area of the authenticating device incorporated in authenticated item 400 (i.e., line position information $X_1$ through $X_5$ of preselected area 204 of FIG. 2*a*) and recording this line position information in digitally coded form on a record medium (such as a strip of magnetic tape).

As indicated in FIG. 4, authenticated item 400 is secured to a motorized X-Y translation stage 402 and is illuminated by a focused beam of illuminating light. Specifically, there is shown an illumination lamp 404, a beam splitter 406, a microscope 408, and a line sensor 410 (such as an E.G. & G. Reticon with 128 linearly-arranged photodetecting elements). Light from lamp 404 is reflected from beam splitter 406 and focused by microscope 408 into a spot that illuminates the authenticating device incorporated in authenticated item 400. Light reflected by the authenticating device, after passing through microscope 408 in the reverse direction and through beam splitter 406, is focused on line sensor 410. Line sensor 410 derives 128 analog signals corresponding to the respective intensities of the light detected by each of the respective 128 elements of the Reticon. The analog signals from line sensor 410 are converted to digital form by analog-to-digital (A/D) converter 412. In this manner, a digital image of a preselected area of the authenticating device incorporated in authenticated item 400 is generated with a spatial resolution of about two micrometers.

In order to microscopically inspect a preselected area, such as scan area 204, computer 414 first transmits command control signals over connection 416 to translation stage 402 thereby causing stage 402, together with authenticated item 400, to be moved to a home position that defines a certain preselected area (i.e., scan area 204) of the authenticating device. The home position can be achieved with high positional accuracy by employing one or more reference points, as is known in the art. After the home position has been achieved, computer 414 sends command control signals to stage 402 over connection 416 to cause the preselected certain area to be successively line scanned each of ten times (as discussed above in connection with FIG. 2*a*). The raw data constitutes approximately 1200 separate image points.

In the portion of the area in between the cracks, the diffractive subtractive color filter reflects most of the incident light back to line sensor 410. However, substantially no light is reflected by the cracks. Therefore, the output of analog-to-digital converter 412, which is applied as an input to computer 414, indicates the occurrence of cracks. Computer 414 utilizes the digital information from converter 412 to (1) register the detection of a crack along a scan line, (2) register the X position of translation stage 402 at which a crack is detected during each scan line, and (3) determine which cracks have the same X position in each and every one of the ten successive scan lines, thereby defining the X positions of only those straight-line cracks oriented substantially parallel to the grating which extend the entirety of the height of the preselected area. In this manner, the very large amount of raw data is greatly reduced to about 5–10 8-bit numbers for an image field having an area of $250 \times 20$ micrometers.

Computer 414 serves an additional function. It digitally encodes each of the 8-bit numbers that specify the X position of each of the straight lines (such as $X_1$ through $X_5$ in FIG. 2*a*) and then stores these digital codes on a record medium. In general, the record medium can have any known form for storing digital information and may be situated any place which is later accessible for the purpose of determining whether an item purporting to be a genuine authenticated item of sheet material is, in fact, genuine or counterfeit. However, a preferred form for the record medium is a strip of magnetic tape, which may be physically incorporated in the authenticated item itself. An example of this is shown in FIG. 3, where a strip of magnetic tape 304 is incorporated in the bottom of authenticated item 300. In the case where the record medium is a strip of magnetic tape, computer 414 controls magnetic tape recorder 418 to record the digital codes of the line-position information (such as $X_1$ through $X_5$ of FIG. 2*a*) on a strip of magnetic tape. Thereafter, the recorded strip of magnetic tape can be incorporated in the authenticated item as indicated in FIG. 3.

While authenticated item 300 can be any form of secure document, of particular interest is a credit or other type of card which may be used to operate unattended automatic goods or service dispensing machines (such as a gasoline dispensing machine, a pay telephone, or a gate or turnstile for access to a train, bus, or parking lot). Such machines require relatively simple and inexpensive readout apparatus for determining whether a presented card is, in fact, genuine or counterfeit. Such a simple and inexpensive readout apparatus is shown in FIG. 5.

A purported genuine secure document 500 (having a structure generally similar to that shown in FIG. 3) is inserted in a slot (or other type of document receiver) of an automatic goods or service vending machine, where it engages mechanical drive 502 of the readout apparatus shown in FIG. 5. Mechanical drive 502 moves document 500 in a left-to-right horizontal direction at a given speed. Magnetic tape reading head 504, which is situated in cooperative relationship with magnetic tape strip 506 of document 500, reads out the digital codes recorded on magnetic tape 506. The output signal from magnetic tape reading 504 is applied as a first input to microprocessor ($\mu$p) 508 over connection 510. At the same time, the preselected area of the authenticating device 512 of document 500 is microscopically inspected for the purpose of extracting line position information corresponding to those lines that are oriented substantially parallel to the grating orientation. This is accomplished by optical means comprising microscope 514, linear diffuser 516, and photocell 518. More specifically, authenticating device 512 is illuminated by a light source (not shown), while authenticating device 512 is moved with the rest of document 500 by mechanical drive 502. This permits the optical means element 514, 516, and 518 to scan the width of the preselected area of authenticating device 512 to detect the changing intensity of the light reflected therefrom. More specifically, linear diffuser 516, situated in the reflected light path between microscope 514 and photocell 518, is oriented to spread the reflected light reaching photocell 518 solely in a direction perpendicular to the plane of the paper (i.e., substantially parallel to the orientation of the grating lines of authenticating device 512). The result is that, while none of the cracks of the crack pattern of authenticating device 512 reflects light, only those cracks which are oriented substantially parallel to the orientation of the grating lines and extend the entire height of the preselected area, produce significant changes in the level of the signal detected by photocell 518. The output from photocell 518 is applied as a second input to microprocessor 508 over connection 520.

Microprocessor 508 serves the function of (1) decoding digital codes applied thereto over connection 510, (2) processing the first signal input applied thereto over connection 520 to extract the line-position information manifested thereby, (3) comparing this extracted line information with the line information contained in a decoded digital codes, and (4) based on this comparison, functionally either indicating "yes" the presented document 500 is genuine, or "no" the presented document 500 is counterfeit. Only a "yes" indication permits the automatic vending machine to be operated.

The principles of the present invention are not confined to an authenticating device of the type disclosed in the aforesaid U.S. patent application Ser. No. 387,614 which inherently forms random crack pattern of the type discussed herein. The principles of the present invention apply whenever there is a random pattern of fine lines present. Such a pattern may develop in interference filter type layers (which also have been proposed as useful as an authenticating device) or in thin metal films. Further, if the random pattern does not inherently develop by itself during fabrication, it is simple enough to purposely produce it by such mechanical means as scratching.

What is claimed is:

1. In combination:

an individual item of sheet material incorporating an element purporting to be a particular one of a given type of authenticating device, wherein said given type of authenticating device exhibits predetermined macroscopic reflectivity characteristics and wherein said particular authenticating device includes a unique pattern of microscopic lines having widths in the order of micrometers that are randomly positioned in at least one dimension with each separation distance between adjacent lines being in the order of tens of micrometers;

a record medium forming part of said item of sheet material and having recorded thereon digital codes representing the locations of the respective line positions of at least some of said pattern lines in at least said one dimension within a certain preselected area of said particular authenticating device;

wherein said element is comprised of a relatively high index-of-refraction inorganic dielectric coating layer situated at the interface between relatively low index-of-refraction plastic substrate and overcoat layers, said interface being in the form of a surface relief pattern defining a diffraction-grating-line structure having a value of line spacing period with respect to at least some of the free-space wavelengths included in polychromatic illuminating light such that both zero and first diffraction order light can propagate in said inorganic dielectric coating layer but only zero diffraction order light can propagate in said plastic substrate and overcoat layers; and wherein said dielectric coating layer inherently forms a random pattern of cracks that define said pattern lines, such pattern lines being preferentially oriented substantially parallel to said lines of said grating-line structure.

* * * * *